US010001795B2

(12) United States Patent
Jefremow et al.

(10) Patent No.: US 10,001,795 B2
(45) Date of Patent: Jun. 19, 2018

(54) LINEAR REGULATOR WITH IMPROVED STABILITY

(71) Applicant: Dialog Semiconductor (UK) Limited, London (GB)

(72) Inventors: Mihail Jefremow, Augsberg (DE); Dan Ciomaga, Ingolstadt (DE); Qiao Yang, Munich (DE); Stephan Drebinger, Munich (DE); Fabio Rigoni, Karlsfeld (DE)

(73) Assignee: Dialog Semiconductor (UK) Limited, London (GB)

( * ) Notice: Subject to any disclaimer, the term of this patent is extended or adjusted under 35 U.S.C. 154(b) by 2 days.

(21) Appl. No.: 15/248,039

(22) Filed: Aug. 26, 2016

(65) Prior Publication Data
US 2017/0060157 A1    Mar. 2, 2017

(30) Foreign Application Priority Data

Aug. 28, 2015 (DE) .................. 10 2015 216 493

(51) Int. Cl.
*H02M 3/155* (2006.01)
*G05F 1/575* (2006.01)

(52) U.S. Cl.
CPC ............ *G05F 1/575* (2013.01); *H02M 3/155* (2013.01)

(58) Field of Classification Search
None
See application file for complete search history.

(56) References Cited

U.S. PATENT DOCUMENTS 5,850,139 A * 12/1998 Edwards ................ G05F 1/565
                                                  323/280
6,624,994 B1 * 9/2003 Schmoock ......... H03K 17/0822
                                                  323/908
2004/0245974 A1 * 12/2004 Kitani .................... H02M 1/36
                                                  323/284

(Continued)

FOREIGN PATENT DOCUMENTS

DE         10119858         11/2002

OTHER PUBLICATIONS

German Office Action, File No. 10 2015 216 493.4, Applicant: Dialog Semiconductor (UK) Limited, dated Dec. 11, 2015, 8 pgs and English language translation, 10 pgs.

*Primary Examiner* — Jeffrey Gblende
(74) *Attorney, Agent, or Firm* — Saile Ackerman LLC; Stephen B. Ackerman (57) ABSTRACT

A linear regulator is presented. It comprises a first amplifier stage, one of the inputs being coupled with the output of the linear regulator. It has an intermediate amplifier stage. The input of the intermediate amplifier stage is coupled to the output of the first amplifier stage. It has a driver stage having a pass device driven by the output of the driver stage. The output of the pass device provides the output of the linear regulator. The regulator has a voltage-to-current feedback circuit coupled with the driver stage and the output of the first amplifier stage for regulating the output resistance of the first amplifier stage depending on load conditions of the linear regulator. The voltage-to-current feedback circuit has a transistor and a current limitation circuit to limit the regulation of the output resistance of the first amplifier stage to low load conditions of the linear regulator.

20 Claims, 8 Drawing Sheets

(56) References Cited

U.S. PATENT DOCUMENTS

| | | | | |
|---|---|---|---|---|
| 2005/0184717 A1* | 8/2005 | Walters | ............... | H02M 3/156 323/284 |
| 2006/0279268 A1* | 12/2006 | Yu | ..................... | H02M 3/156 323/282 |
| 2012/0187930 A1* | 7/2012 | Williams | ............ | G05F 1/5735 323/273 |
| 2013/0147447 A1* | 6/2013 | Liu | ..................... | G05F 1/575 323/273 |
| 2013/0293986 A1* | 11/2013 | Lerner | ................. | G05F 1/573 361/18 |
| 2015/0015331 A1 | 1/2015 | Kronmuelter | | |
| 2015/0229124 A1* | 8/2015 | Kim | ..................... | G05F 1/571 361/86 |

\* cited by examiner

LINEAR REGULATOR WITH IMPROVED STABILITY

TECHNICAL FIELD

The present document relates to linear regulators and in particular to low dropout regulators (LDOs) and provides increased stability and robustness of the regulation by limiting the gain of a first amplifier stage at low load conditions.

BACKGROUND

Almost every modern power management integrated circuit, IC incorporates a variety of different low dropout regulators to provide stable and accurately regulated supply rails. The design of LDOs strongly differs from a conventional regulator design were the output current load is well defined. In contrast, the LDO circuit needs to be stable from no load current to its specified maximum load current. This requirement changes significantly the transfer function of the LDO and makes it a design challenge to provide a stable supply over a variety of the load conditions for the specified accuracy and power consumption.

Prior art compensation schemes for linear regulators rely on a Miller compensation capacitance to split the dominant and the non-dominant pole to make the regulator stable. However, the bias current of the first stage has to be as low as possible to guarantee the pole splitting at no current load (no load condition).

Another important requirement of a LDO circuit is a sink capability which provides a supply line regulation for fast load changes. Most state of the art approaches do not have "a time continues" sink capability. They sink current by enabling a constant load if the output voltage rises above a certain threshold, which can cause voltage overshoot at the supply rail and disrupt the performance of the LDO circuit.

SUMMARY

There is therefore a need to improve the stability and robustness of a linear regulator at no load condition so that the bias current of the first stage can be chosen independently for better performance. Furthermore, there is a need to create "a time continues" sink stage for improved load transient performance.

The present document addresses the above mentioned technical problems. In particular, the above problems are solved by the claimed subject-matter according to the independent claims.

According to a broad aspect of this disclosure, a linear regulator is provided. The linear regulator comprises a first amplifier stage having an input and an output, one of the inputs being coupled with the output of the linear regulator to provide a main feedback loop. The regulator further comprises an intermediate amplifier stage having an input and an output. The input of the intermediate amplifier stage is coupled to the output of the first amplifier stage. The intermediate amplifier stage may comprise one or more voltage amplification stages that are connected in series. Furthermore, a driver stage having an input and an output is provided. The regulator further comprises a pass device driven by the output of the driver stage. One terminal of the pass device may be connected to the supply voltage, e.g. the source of a PMOS transistor. The output of the pass device (e.g. the drain of the PMOS transistor) provides the output node of the linear regulator where a load is connected to obtain an output voltage and an output current of the regulator. In embodiments, the linear regulator is a low dropout regulator.

In addition, a voltage-to-current feedback circuit (also called a series shunt feedback) coupled with the driver stage and the output of the first amplifier stage for regulating the output resistance of the first amplifier stage depending on load conditions of the linear regulator is provided. The voltage-to-current feedback circuit comprises a transistor that may be driven by an intermediate voltage of the driver stage, to provide regulated current to the output node of the first amplifier stage. The voltage-to-current feedback circuit further comprises a current limitation circuit to limit the current provided to the output node of the first amplifier stage. Thus, the current supplied to the output node of the first amplifier stage is controlled depending on the load conditions of the linear regulator, thereby actively regulating the output resistance of the first amplifier stage. Due to the current limitation circuit, the regulation of the output resistance of the first amplifier stage is limited to low load conditions of the linear regulator. For example, in case of a low load, the voltage-to-current feedback circuit reduces the gain of the first amplifier stage.

The proposed regulation allows achieving stability at no load condition without need to reduce the bias current of the first amplifier stage, which significantly improves the performance of the regulator and saves chip area because of the lower Miller capacitance that is needed for stability. The stability at no load can be adjusted and makes the circuit extremely robust.

In case of a low load, the voltage-to-current feedback circuit reduces the gain of the first amplifier stage.

By limiting the gain of the first amplifier stage, said voltage-to-current feedback circuit provides active pole splitting. The advantage of the proposed gain regulation is that besides the gain reduction also the non-dominant pole in the overall transfer function is moved to higher frequencies. This significantly improves stability of the regulator. In addition, the feedback loop has always negative feedback and therefore is stable in any condition. Simultaneously, the load transient response and the output noise performance improve. No minimum resistance in series with the load capacitance is needed.

The current limitation circuit may comprise a transistor or a current mirror to limit the current that can be supplied to the output node of the first amplifier stage. This restricts the regulation of the output resistance of the first amplifier stage to low load conditions of the linear regulator. For example, the transistor or current mirror may serve as a current source that supplies a maximum current to limit the current that the voltage-to-current feedback circuit can provide.

The input of the driver stage may be coupled to the output of the intermediate amplifier stage. The driver stage may comprise a first transistor operating as an inverter and a second transistor in series to the first transistor. The second transistor may be configured in a current mirror arrangement with the pass device where the gate of the second transistor and the gate of the pass device are connected. The gate of the transistor of said voltage-to-current feedback circuit may be coupled with the gate of the pass device or the gate of the second transistor. This forms another current mirror arrangement so that the current through the transistor of said voltage-to-current feedback and consequently the current supplied to the output node of the first amplifier stage depends on the load of the pass device, i.e. the load current of the regulator. This current through the transistor of the voltage-to-current feedback is limited by the current limitation circuit as described above.

The linear regulator may comprise a driver stage replica coupled between the output of said intermediate amplifier stage and the input of the driver stage. The driver stage replica may be configured similar to the driver stage, i.e. comprising a first transistor operating as an inverter and a second transistor in series to the first transistor. The gate of the transistor of said voltage-to-current feedback circuit may be coupled with the driver stage replica, in particular, coupled with the gate of the second transistor of the driver stage replica so that both transistors form a current mirror. As a result, the voltage-to-current feedback circuit is controlled by the driver stage replica instead of the driver stage itself, however the result is the same, namely that current is supplied to the output of the first amplification stage depending on the load of the pass device.

In embodiments, the transistor of said voltage-to-current feedback circuit is in a current mirror configuration with a driver transistor in the driver stage or a transistor in the driver stage replica. The driver transistor is typically the second transistor of the driver stage or the driver stage replica. Thus, the current through the transistor of said voltage-to-current feedback and consequently the current supplied to the output node of the first amplifier stage depends on the current through the pass device, i.e. the load current of the regulator. This current through the transistor of the voltage-to-current feedback is limited by the current limitation circuit as described above.

According to another broad aspect, the linear regulator may comprise a sink device to sink current from the output of the linear regulator. The sink device provides a current path to ground to sink current from the output of the regulator to improve load transient performance for fast load changes. This assists to avoid voltage overshoot at the supply rail, when the sink device operates time continuously, controlled by the regulator output voltage.

The regulator may further comprise a sink driver stage to drive the sink device so as to sink current from the regulator output during a voltage overshoot. The sink driver stage may be coupled with the output of the intermediate amplifier stage or the driver stage replica. The sink driver stage may comprise a first inverting stage that is coupled with the supply voltage and a second inverting stage that is coupled with ground. The first inverting stage may comprise a current mirror. The second inverting stage may comprise a transistor that is configured in a current mirror configuration with the sink device.

The linear regulator may further comprise a sink feedback circuit coupled with the sink driver stage and the output of the first amplifier stage for regulating the output resistance of the first amplifier stage depending on load conditions of the linear regulator. The sink feedback circuit may comprise a transistor and a current limitation circuit to limit the regulation of the output resistance of the first amplifier stage to low load conditions. The principle behind the sink feedback circuit and the gain limitation for the sink stage is the same as for the source stage (i.e. the pass device). That is, the sink feedback circuit may be configured similar to the voltage-to-current feedback circuit, but with supply voltage and ground exchanged. Current is drawn (sinked) from the output node of the first amplifier stage depending on the load conditions of the linear regulator, thereby actively regulating the output resistance of the first amplifier stage.

Due to the current limitation circuit in the sink feedback circuit, the regulation of the output resistance of the first amplifier stage is limited to low load conditions of the linear regulator. For example, the current limitation circuit in the sink feedback circuit limits the amount of current that can be drawn from the node between the first amplifier stage and the intermediate voltage amplifier stage. In embodiments, the current limitation circuit may comprise a transistor or a current mirror to limit the current that can be sinked from the output node of the first amplifier stage. For example, the transistor or current mirror may serve as a current sink that draws a maximum current to limit the current that the sink feedback circuit can sink.

The regulation of the gain of the first amplifier stage by controlling the output resistance of the first amplifier stage, increases stability at no load condition without need to reduce the bias current of the first amplifier stage. This significantly improves the performance of the regulator.

According to another aspect, a method of operating a linear regulator is proposed. The linear regulator comprises a first amplifier stage, an intermediate amplifier stage, a driver stage, and a pass device. The linear regulator may be configured as disclosed above. The method comprises limiting the gain of the first amplifier stage at low load conditions of the linear regulator by regulating the output resistance of the first amplifier stage depending on load conditions of the linear regulator. Thus, stability of the regulator is improved by active pole splitting due to the gain limitation of the first amplifier stage. By reducing the output resistance of the first amplifier stage at low load conditions, the higher frequency pole of the regulator transfer function is shifted to higher frequencies which increases the phase margin and improves regulation stability.

Limiting the gain of the first amplifier stage may comprise injecting current into a node between the first amplifier stage and the intermediate voltage amplifier stage, wherein the injected current depends on the load current provided by the linear regulator. Limiting the gain of the first amplifier stage is typically restricted to low load conditions by limiting the amount of injected current.

The linear regulator may further comprise a sink device as disclosed above. In this case, the method may further comprise sinking current from the node between the first amplifier stage and the intermediate voltage amplifier stage depending on the current sinked by the sink device. Thus, the regulation of the output resistance of the first amplifier stage is also controlled by the operation of the sink device, and the gain of the first amplifier stage is limited during source and sink mode of the regulator.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the terms "couple", "coupled", "connect", and "connected" refer to elements being in electrical communication with each other, whether directly connected e.g., via wires, or in some other manner.

DESCRIPTION

Figure 1:
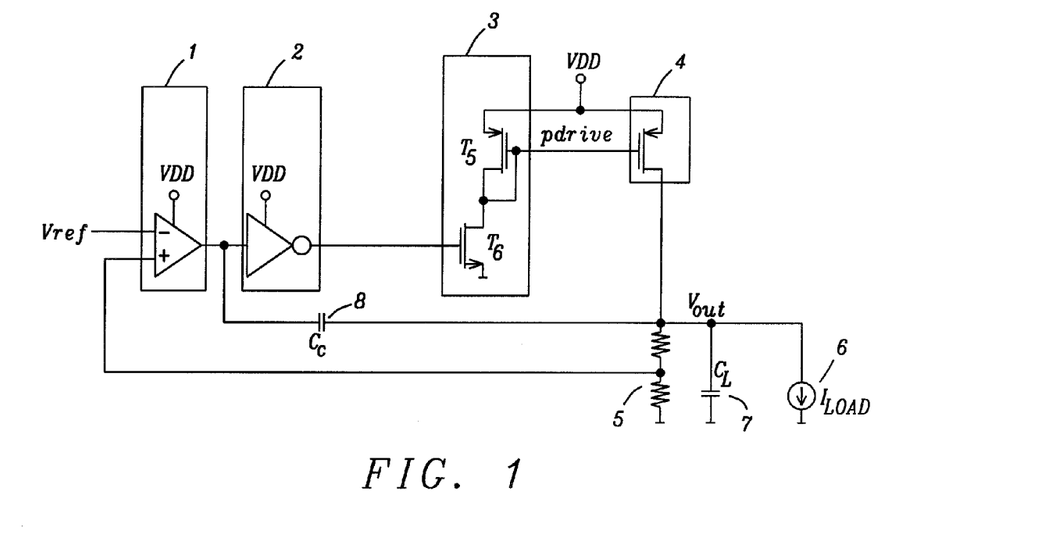
FIG. 1 shows a circuit diagram of a low dropout (LDO) regulator.

FIG. 1 shows a low dropout (LDO) regulator having a first amplification stage 1, an intermediate amplification stage 2, a driver stage 3, and a pass device 4. The first amplification stage 1 is a differential amplifier with one input coupled to the reference voltage $V_{ref}$ and the other input coupled to the regulator output voltage $V_{out}$, via a voltage divider 5. A load 6 is coupled with the regulator output in parallel with an output capacitance $C_L$ 7. The load 6 draws a load current $I_{LOAD}$ from the regulator. The intermediate amplification stage 2 may be an inverter and may comprise a plurality of substages. The driver stage 3 comprises a common source NMOS transistor $T_6$ and a driver transistor $T_5$ that is a PMOS transistor in diode configuration. The gate of driver transistor $T_5$ is connected with the gate of the pass device which is also a PMOS transistor, both transistors forming a current mirror. A Miller capacitance Cc 8 is coupled between the regulator output and the node between the first amplification stage and the intermediate amplification stage.

At no load condition ($I_{LOAD}=0$ A), the low frequency pole is $p_1$ and the high frequency pole is $p_2$ where $R_L$ is the resistance seen on the output $V_{out}$, $A_m$ is the gain seen from the output of the first amplification stage to the output $V_{out}$ of the regulator, and $R_1$ is the output resistance of the first amplification stage:

$$p_1 = \frac{1}{2\pi(C_L R_L + A_m C_c R_1)}$$

$$p_2 = \frac{1}{2\pi C_c R_1} + \frac{g_{m,passdevice}}{2\pi C_L}.$$

Figure 2:
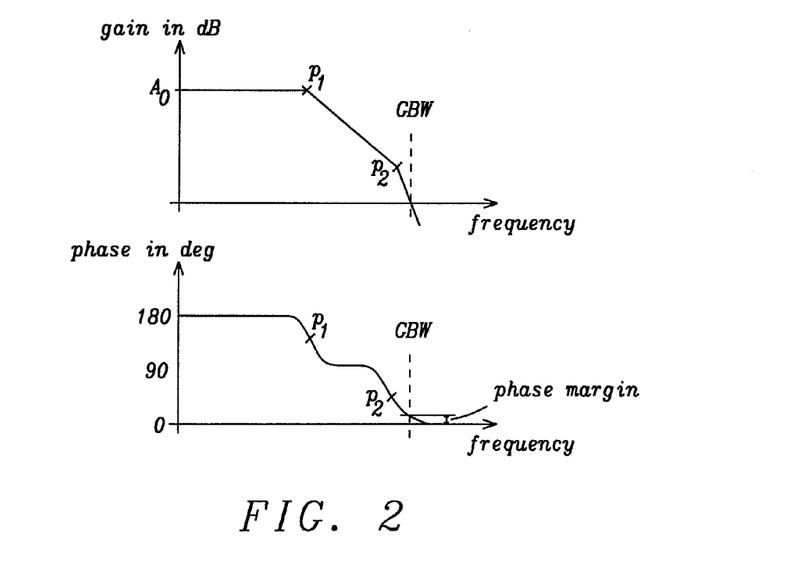
FIG. 2 shows the overall transfer function of the regulator of FIG. 1.

The overall transfer function of the regulator is shown in FIG. 2. $A_0$ is the overall frequency gain and $A_1$ is the gain of the first amplification stage: $A_0=A_1*A_m$.

A problem with this prior art LDO circuit is the low phase margin at the gain bandwidth (GBW) point where the gain becomes zero, which results in low stability and robustness at low loads. As a consequence, $R_1$ has to be as high as possible for stability. This however results in a low bias current in the first stage which causes worse load transient performance.

Figure 3:
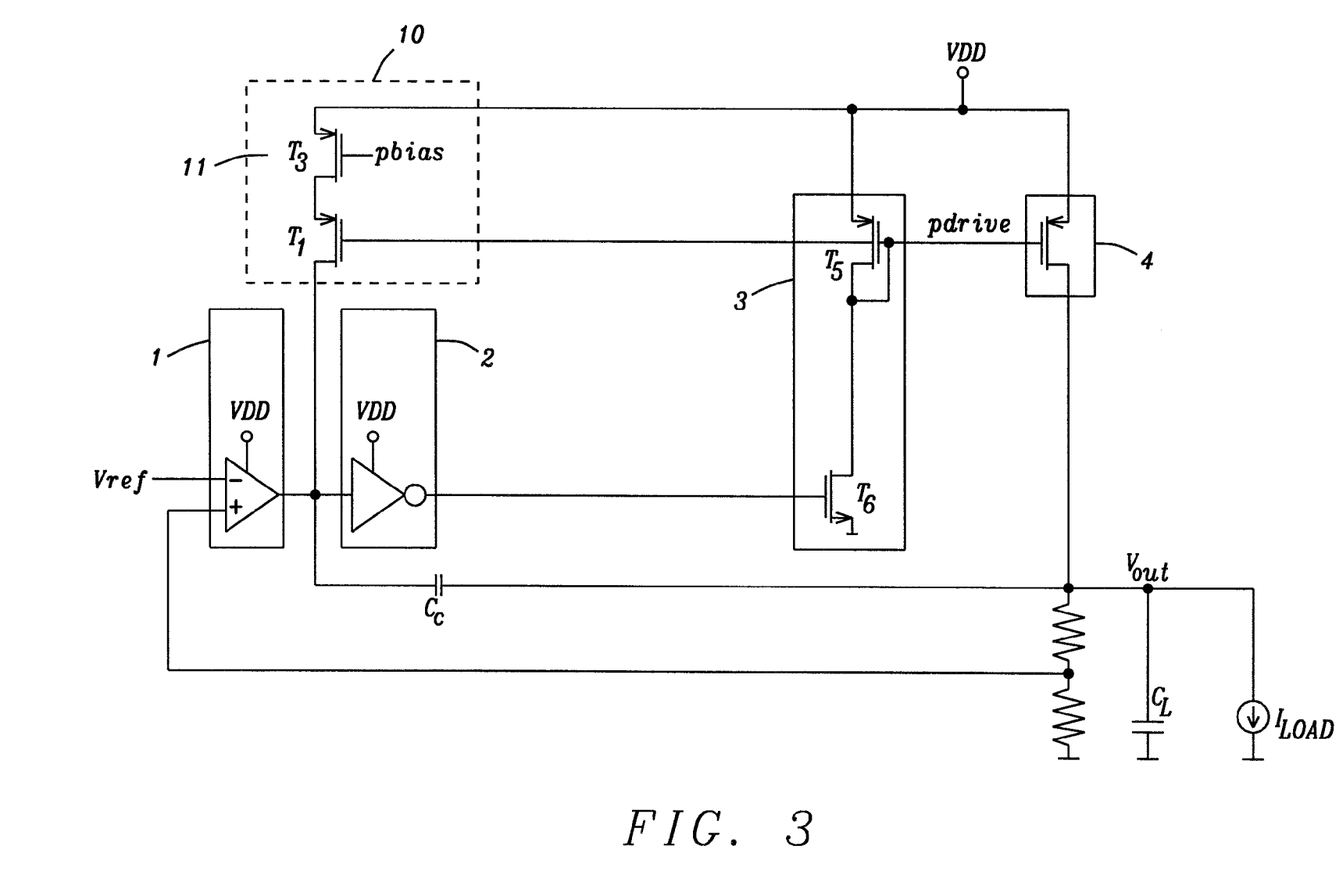
FIG. 3 shows a circuit diagram of a regulator according to an embodiment.

FIG. 3 shows a regulator embodying an example for the gain limitation of the first amplification stage. Same reference numerals denote same elements as in the regulator shown in FIG. 1. In addition, a gain limitation circuit 10 is provided for regulating the output resistance of the first amplifier stage 1 and consequently the gain of the first amplifier stage 1 depending on load conditions of the linear regulator.

The gain limitation circuit 10 is implemented as a voltage-to-current feedback circuit (also called a series shunt feedback) coupled with the driver stage 3 and the output of the first amplifier stage 1. Gain limitation circuit 10 comprises a transistor $T_1$ that is driven by the drive voltage pdrive of the driver stage. Transistor $T_1$ is coupled between first amplifier stage 1 and intermediate amplification stage 2 to provide current to the output node of the first amplifier stage. The current supplied to the output node of the first amplifier stage is controlled depending on the load conditions of the linear regulator, thereby actively regulating the output resistance of the first amplifier stage.

Gain limitation circuit 10 further comprises a current limitation circuit 11 to limit the current provided to the output node of the first amplifier stage and thereby limiting the regulation of the output resistance of the first amplifier stage to low load conditions of the linear regulator. In the depicted embodiment, current limitation circuit 11 comprises a transistor $T_3$, the source of which is coupled with the supply voltage VDD, the drain coupled with the source of Transistor $T_1$. The gate of transistor $T_3$ is coupled with a constant voltage pbias so that the current flowing through $T_3$ is limited to a maximum current. At high load conditions, transistor $T_3$ limits the current of the gain limitation circuit 10 as it enters the saturation region and the output resistance of the first stage is no more reduced. Transistors $T_1$ and $T_2$ may both be PMOS transistors.

As alternative, current limitation circuit 11 may comprise a current mirror, one branch thereof having a transistor in diode configuration and a current source. The other branch of the current mirror has a transistor similar to $T_3$, whose gate is coupled with the gate and drain of the diode configured transistor.

The proposed regulation of the first amplifier stage gain achieves stability at no load condition without the need to reduce the bias current of the first amplifier stage, which significantly improves the performance of the regulator. Only a lower Miller capacitance is needed to ensure stability which reduces area and cost of the regulator. The feedback loop has always a negative feedback and no minimum series resistance in series with the load capacitance is needed. Active pole splitting is achieved by the limitation of the gain of the first amplifier stage. Besides the gain reduction, also the non-dominant pole in the overall transfer function is moved to higher frequencies, which significantly improves the stability.

Figure 4:
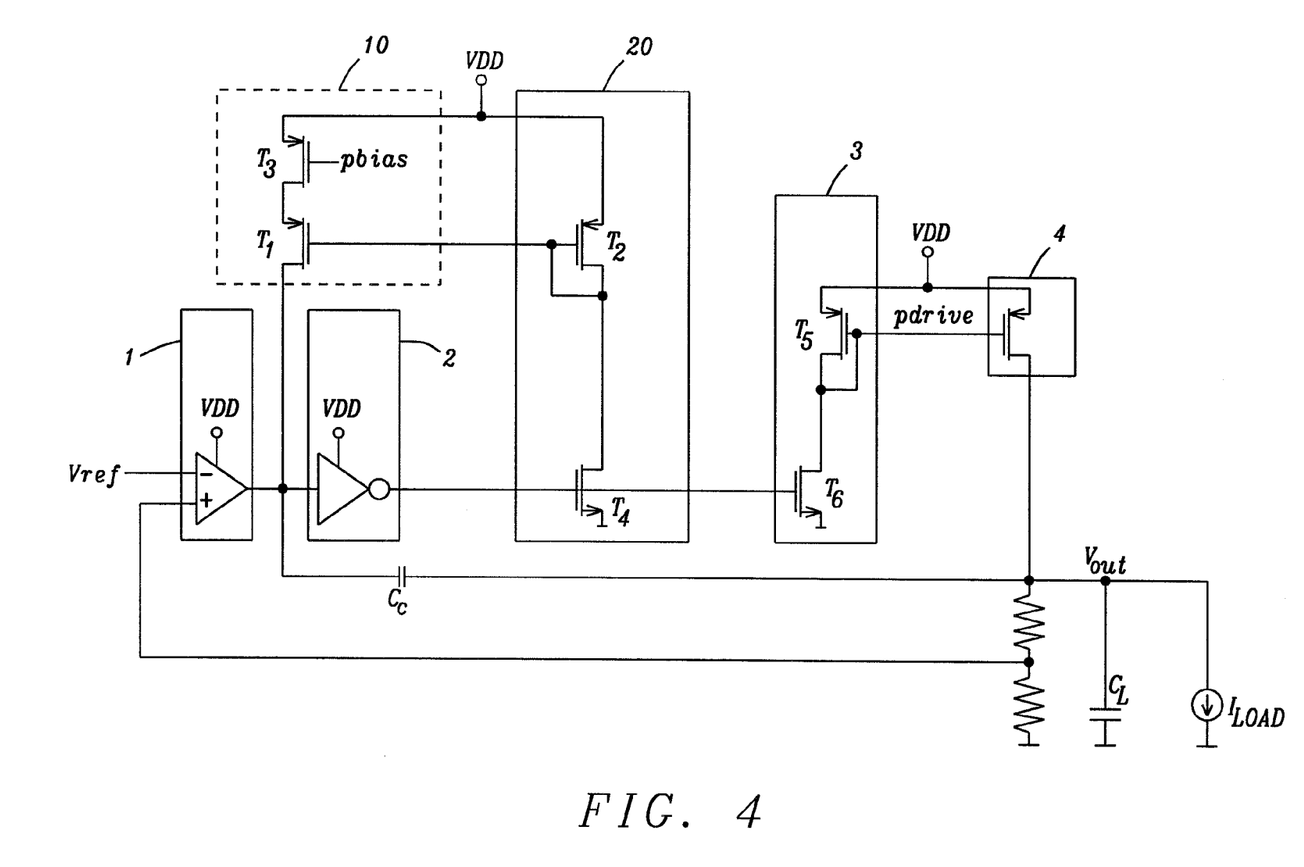
FIG. 4 shows another embodiment of a regulator with a driver stage replica.

FIG. 4 shows another embodiment of a regulator with gain limitation for the first amplifier stage. In this embodiment, a driver stage replica 20 is used for controlling the gain limitation circuit 10 which is similar to above. The voltage-to-current feedback circuit thus comprises the gain limitation circuit 10 and the driver stage replica 20.

Driver stage replica 20 is coupled between the output of said intermediate amplifier stage 2 and the input of the driver stage 3. The driver stage replica 20 is configured similar to the driver stage 3, i.e. comprising a first transistor $T_4$ operating as an inverter and a second transistor 12 in series to the first transistor. That is, driver stage replica 20 comprises transistors $T_2$, $T_4$ similar to transistors $T_5$, $T_6$. The gate of transistor $T_1$ of the gain limitation circuit 10 is coupled with the gate of the second transistor $T_2$ of the driver stage replica.

Transistor $T_1$ of the gain limitation circuit 10 is in a current mirror configuration with transistor $T_2$ in the driver stage replica 20. Thus, the current through transistor $T_1$ and consequently the current supplied to the output node of the first amplifier stage depends on the load through the pass device, i.e. the load of the regulator. The current through transistor $T_1$ is limited by the current limitation circuit 11 as described above.

Driver stage replica 20 decouples the large gate capacitance of the pass device on the pdrive node from the feedback circuit. In addition, a separate supply voltage may be used for the pass device 4 and the gain limitation circuit 10 to avoid noise being coupled into the regulation loop, thereby increasing the power supply rejection ratio (PSSR). Gain limitation circuit $T_3$ and driver stage replica $T_2$, $T_4$ actively regulate the output resistance of the first amplifier stage at low load conditions as explained above.

Figure 5:
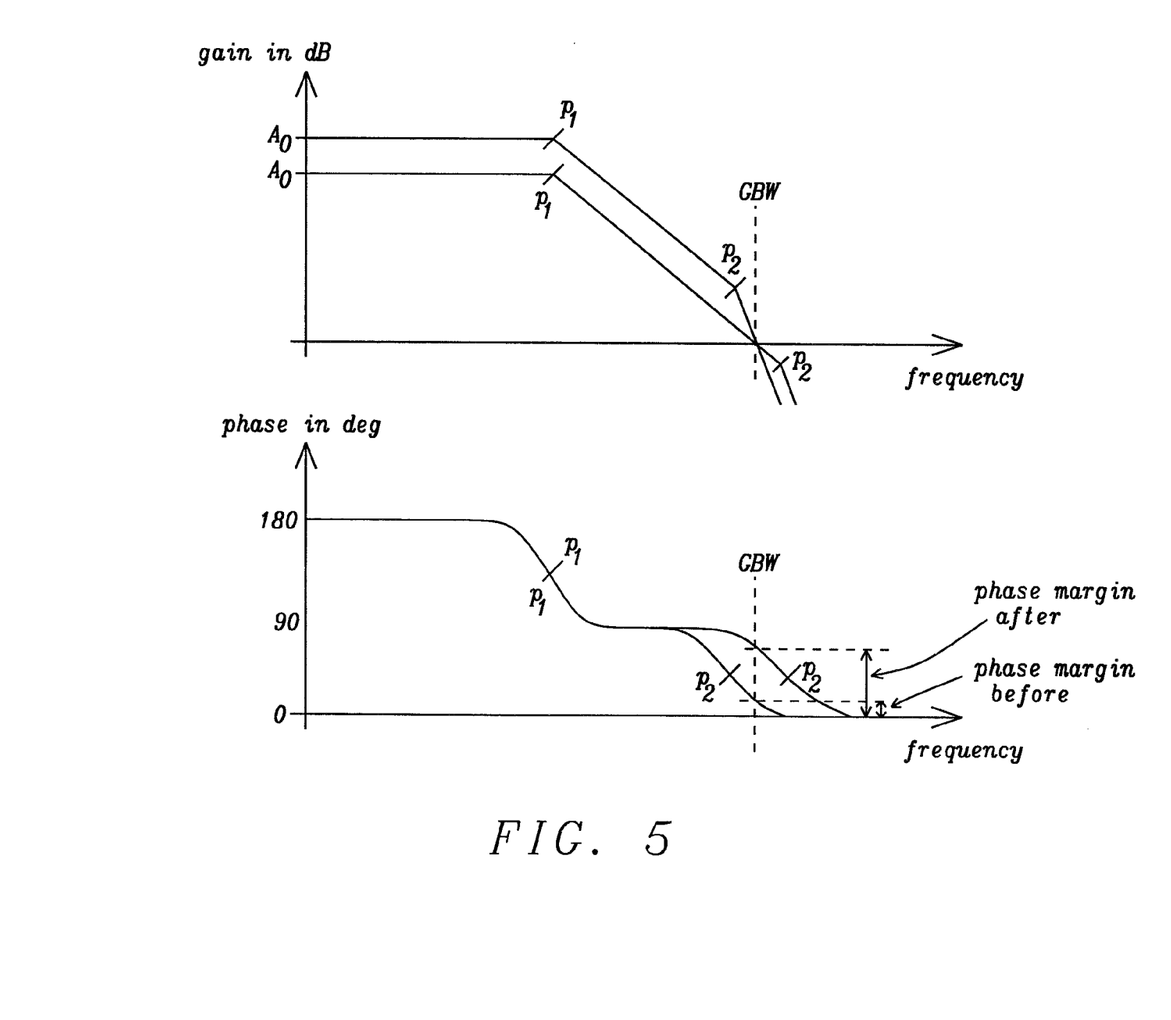
FIG. 5 shows the overall transfer function of a regulator according to an embodiment.

FIG. 5 shows the overall transfer function of a regulator embodying the gain limitation of the present invention. $p_1$ is the lower frequency pole $$p_1 = \frac{1}{2\pi\left(C_L R_L + A_m C_c \frac{R_1}{A_G}\right)}$$

and higher frequency pole $p_2$ is $$p_2 = \frac{1}{2\pi C_c R_1} + \frac{g_{m,passdevice}}{2\pi C_L}$$

where $A_G$ is the overall gain from the output of the first amplifier stage to the drain of T1.

The low frequency pole $p_1$ is almost unchanged because his frequency is dominated by $C_L R_L$.

The high frequency pole $p_2$ is shifted to higher frequencies and is now mainly dominated by $$\frac{g_{m,passdevice}}{2\pi C_L}.$$

The overall gain is now reduced to $$A_0 = \frac{A_1 A_m}{A_G}.$$

As one can see from the diagram, the phase margin of the transfer function with $p_2$ shifted to higher frequencies is much larger than before, thus providing more stability for the feedback loop. Further, the phase margin can be adjusted independently of the bias of the first amplifier stage. In result, the proposed active gain limitation provides higher robustness and better performance compared to prior art regulators.

Figure 6:
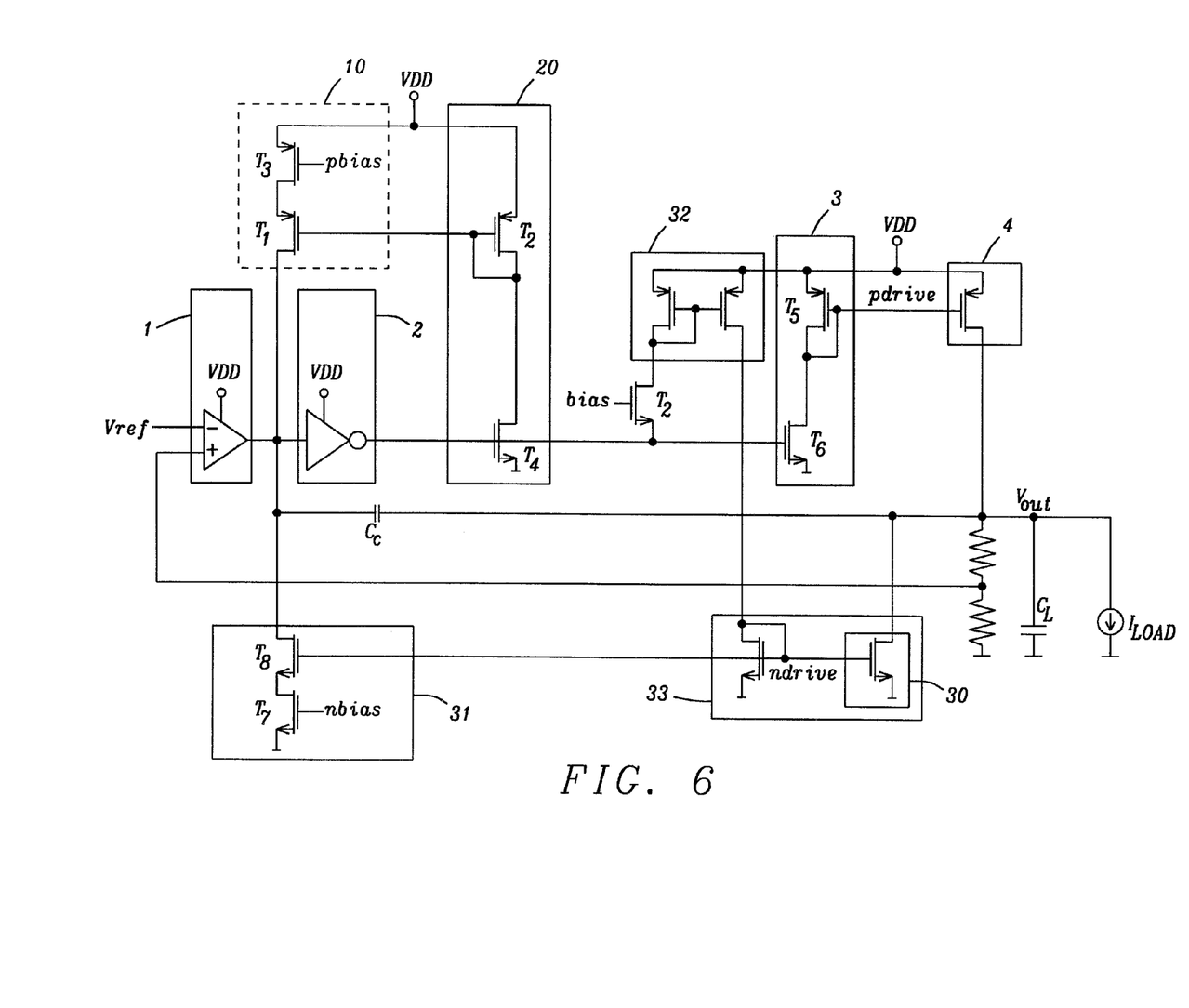
FIG. 6 shows a circuit diagram of a regulator comprising a sink device.

In order to improve regulation for fast load transients, the regulator may have a sink capability to sink current if the output voltage rises above a certain threshold, so as to reduce voltage overshoot. FIG. 6 shows a regulator comprising a sink device 30 that is coupled with the output node of the regulator. The sink stage allows better load transient performance for fast load changes.

The regulator comprises a sink driver stage to drive the sink device 30 so as to sink current from the regulator output during a voltage overshoot. The sink driver stage is coupled with the output of the intermediate amplifier stage or the driver stage replica. The sink driver stage comprises a first inverting stage 32 that is coupled with the supply voltage and a second inverting stage 33 that is coupled with ground. The first inverting stage comprises a current mirror. The second inverting stage comprises a transistor that is configured in a current mirror configuration with the sink device 30.

The above gain limitation for the first amplifier stage can also be implemented for the sink stage of the linear regulator. The principle behind the gain limitation for the sink stage is the same as for the source stage explained above.

The regulator further comprises a gain limitation circuit 31 for the sink stage which is coupled with the sink driver stage and the output of the first amplifier stage 1 for regulating the output resistance of the first amplifier stage depending on load conditions of the linear regulator. This implements a sink feedback circuit comprising a transistor $T_8$ and a current limitation circuit to limit the regulation of the output resistance of the first amplifier stage to low load conditions. The current limitation circuit may be realized as transistor $T_7$ in series with transistor $T_8$. The gate of transistor $T_7$ is provided with a constant voltage nbias and its source coupled with ground. Transistor $T_7$ and transistor $T_8$ may be NMOS transistors.

The principle behind the sink feedback circuit and the gain limitation for the sink stage is the same as for the source stage (i.e. the pass device). That is the gain limitation circuit 31 for the sink stage is configured similar to the gain limitation circuit 10 for the source stage, but with supply voltage and ground exchanged. Current is drawn (sinked) from the output node of the first amplifier stage depending on the load conditions of the linear regulator, thereby actively regulating the output resistance of the first amplifier stage.

Due to the current limitation circuit $T_7$ in the gain limitation circuit 31, the regulation of the output resistance of the first amplifier stage is limited to low load conditions of the linear regulator. The current limitation circuit limits the amount of current that can be sinked from the node between the first amplifier stage and the intermediate voltage amplifier stage. The current limitation circuit may also comprise a current mirror to limit the current that can be sinked from the output node of the first amplifier stage. The transistor or current mirror may serve as a current sink that draws a maximum current to limit the current that the sink feedback circuit can sink.

Figure 7:
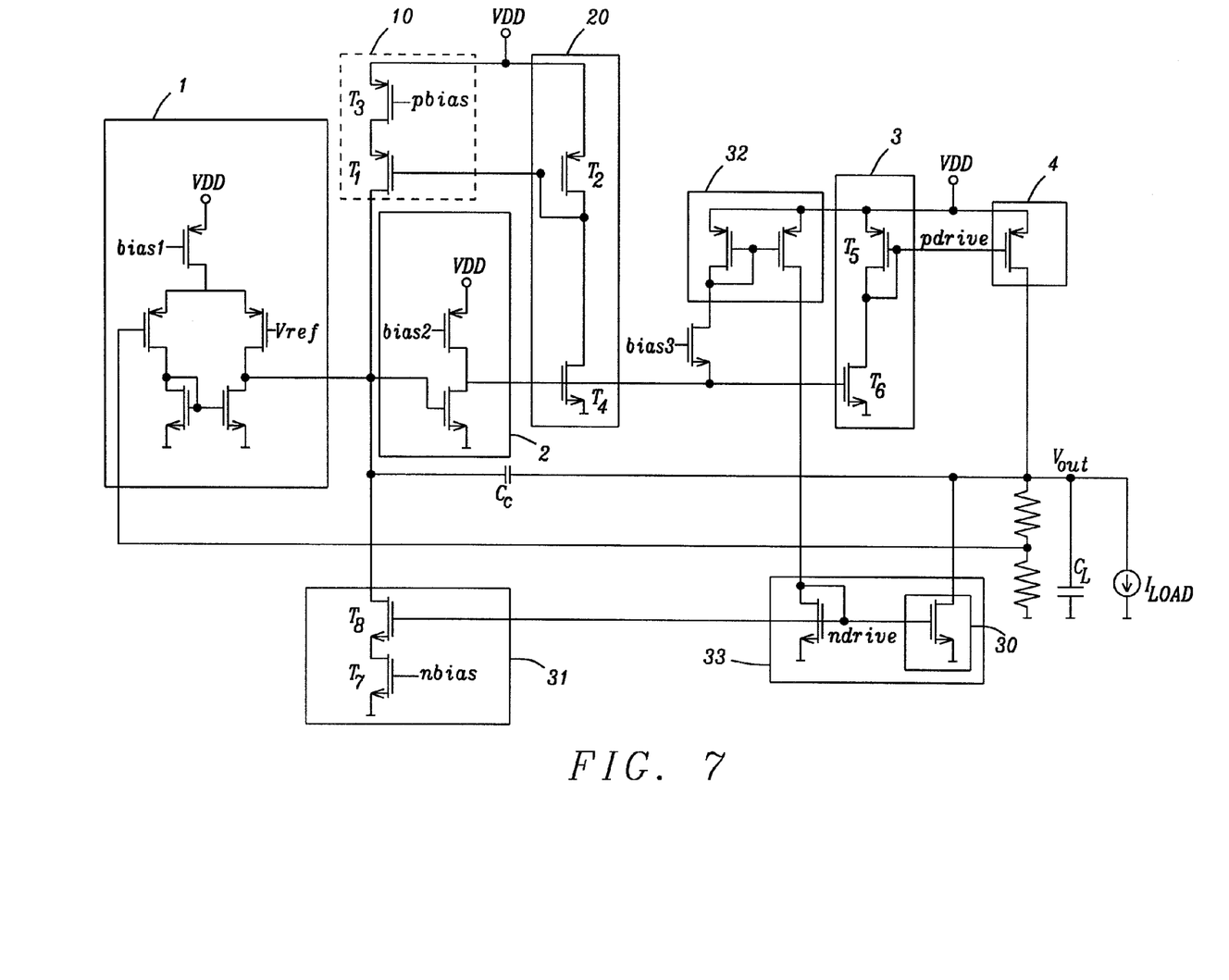
FIG. 7 shows another circuit diagram for a regulator according to an embodiment.

FIG. 7 shows another schematic for a regulator according to an embodiment. The circuit includes a driver stage replica 20, a gain limitation circuit for the source stage 10, a pass device 4, a sink device 30, a sink driver stage 32, 33, and a gain limitation circuit for the sink stage 31. Same reference numerals denote same elements as in the above regulators.

The first amplifier stage 1 is made as conventional operational transconductance amplifier (OTA), but can be also any other amplifier configuration, e.g. a folded cascode or full symmetric configuration. The intermediate amplifier stage 2 is implemented as a common source amplifier. The regulator is a low dropout regulator.

Figure 8:
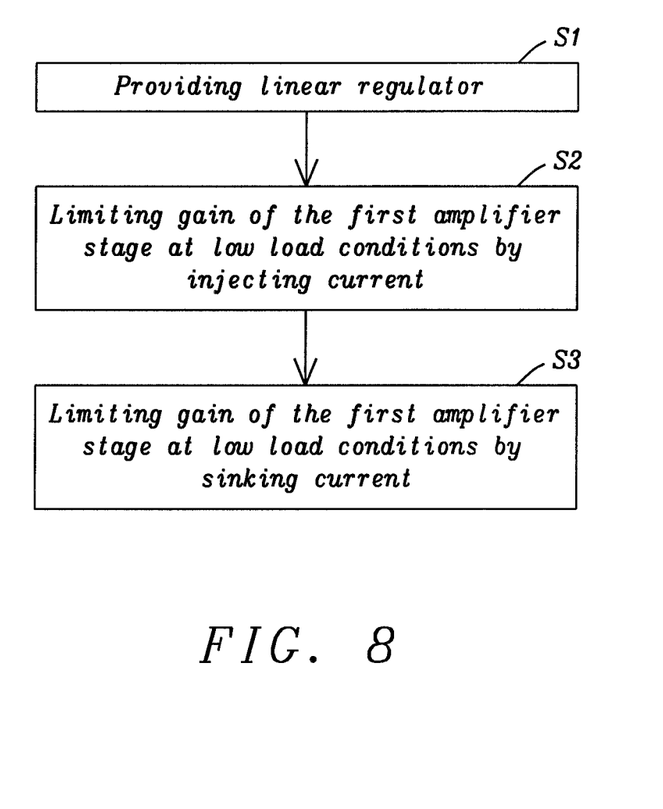
FIG. 8 shows a flowchart for a method of operating a linear regulator according to embodiments.

FIG. 8 illustrates an example method of operating a linear regulator. The linear regulator comprises a first amplifier stage, an intermediate amplifier stage, a driver stage, and a pass device. The linear regulator may be configured as disclosed above and further comprises a sink device.

The method comprises step S1 providing a linear regulator and step S2 limiting the gain of the first amplifier stage at low load conditions of the linear regulator by regulating the output resistance of the first amplifier stage depending on load conditions of the linear regulator. Stability of the regulator is improved by active pole splitting due to the gain limitation of the first amplifier stage. By reducing the output resistance of the first amplifier stage at low load conditions, the higher frequency pole of the regulator transfer function is shifted to higher frequencies which increases the phase margin and improved regulation stability. Limiting the gain of the first amplifier stage comprises injecting current into a node between the first amplifier stage and the intermediate voltage amplifier stage, wherein the injected current depends on the load current provided by the linear regulator. Limiting the gain of the first amplifier stage is restricted to low load conditions by limiting the amount of injected current.

The method further comprises step S3 sinking current from the node between the first amplifier stage and the intermediate voltage amplifier stage depending on the current sinked by the sink device. Sinking current is restricted to low load conditions of the linear regulator. Thus, the regulation of the output resistance of the first amplifier stage is also controlled by the operation on the sink device, and the gain of the first amplifier stage is limited during source and sink mode of the regulator.

Figure 9:
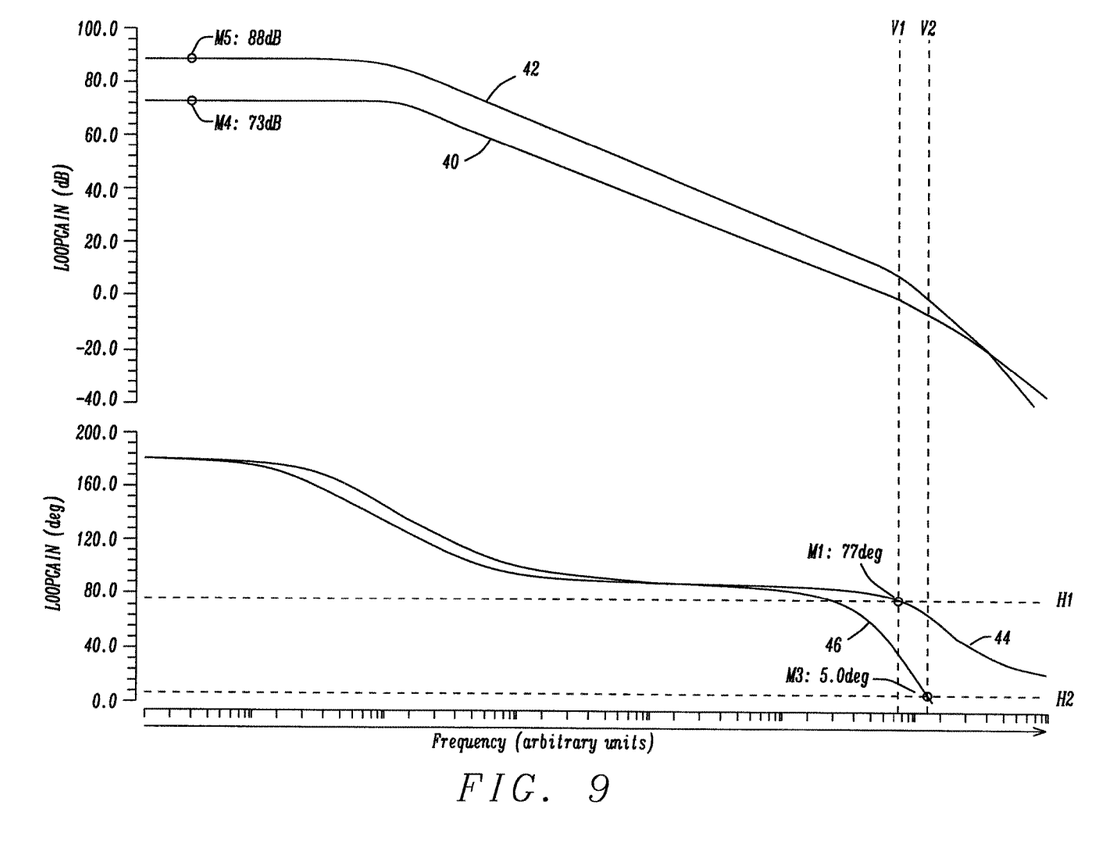
FIG. 9 shows simulation results for the frequency dependent transfer function of a LDO according to an embodiment.

FIG. 9 shows simulation results for the frequency dependent transfer function of a LDO using the proposed active gain regulation versus a prior art regulator. Curve 40 shows the gain of the regulator using the proposed active gain regulation and curve 42 shows the gain of a prior art regulator. Curve 44 shows the phase of the regulator using the proposed active gain regulation and curve 46 shows the phase of a prior art regulator.

As one can see from the diagrams, the gain is reduced for the proposed regulator (see e.g. M6 (91.4384 dB) at 1.37872 mHz to M7 (83.8756 dB) at 1.37806 mHz). Further, the first non-dominant pole is shifted to higher frequencies. The frequency where the gain function crosses 0 dB (GBW) is slightly reduced from M4 (1.57078 kHz) to M1 (980.047 Hz). The phase margin which defines the stability of the regulator is larger than 60 deg (see M2: 63.6973 deg at 986.051 Hz) at no load condition with the present invention, while the phase margin of a prior art regulator is only small (see M5: 8.53259 deg at 1.64454 kHz). This shows the high robustness of the proposed approach.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A linear regulator comprising
a first amplifier stage having an input and an output, one of the inputs being coupled with the output of the linear regulator;
an intermediate amplifier stage having an input and an output, the input of the intermediate amplifier stage being coupled to the output of the first amplifier stage;
a driver stage having an input and an output;
a pass device driven by the output of the driver stage, the output of the pass device proving the output of the linear regulator; and
a voltage-to-current feedback circuit coupled with the driver stage and the output of the first amplifier stage for regulating the output resistance of the first amplifier stage depending on load conditions of the linear regulator, the voltage-to-current feedback circuit comprising a transistor and a current limitation circuit to limit the regulation of the output resistance of the first amplifier stage to low load conditions of the linear regulator,
wherein the input of the driver stage is coupled to said output of said intermediate amplifier stage and the gate of the transistor of said voltage-to-current feedback circuit is coupled with the gate of the pass device.

2. The linear regulator of claim 1, wherein said voltage-to-current feedback circuit provides active pole splitting by gain limitation of the first amplifier stage.

3. The linear regulator of claim 1, wherein said current limitation circuit comprises a transistor or a current mirror.

4. A linear regulator comprising
a first amplifier stage having an input and an output, one of the inputs being coupled with the output of the linear regulator;
an intermediate amplifier stage having an input and an output, the input of the intermediate amplifier stage being coupled to the output of the first amplifier stage;
a driver stage having an input and an output;
a pass device driven by the output of the driver stage, the output of the pass device proving the output of the linear regulator;
a voltage-to-current feedback circuit coupled with the driver stage and the output of the first amplifier stage for regulating the output resistance of the first amplifier stage depending on load conditions of the linear regulator, the voltage-to-current feedback circuit comprising a transistor and a current limitation circuit to limit the regulation of the output resistance of the first amplifier stage to low load conditions of the linear regulator; and
a driver stage replica coupled between the output of said intermediate amplifier stage and the input of the driver stage, wherein the gate of the transistor of said voltage-to-current feedback circuit is coupled with the driver stage replica.

5. A linear regulator comprising
a first amplifier stage having an input and an output, one of the inputs being coupled with the output of the linear regulator;
an intermediate amplifier stage having an input and an output, the input of the intermediate amplifier stage being coupled to the output of the first amplifier stage;
a driver stage having an input and an output;
a pass device driven by the output of the driver stage, the output of the pass device proving the output of the linear regulator; and
a voltage-to-current feedback circuit coupled with the driver stage and the output of the first amplifier stage for regulating the output resistance of the first amplifier stage depending on load conditions of the linear regulator, the voltage-to-current feedback circuit comprising a transistor and a current limitation circuit to limit the regulation of the output resistance of the first amplifier stage to low load conditions of the linear regulator, wherein the transistor of said voltage-to-current feedback circuit is in a current mirror configuration with a driver transistor in the driver stage.

6. A linear regulator comprising
a first amplifier stage having an input and an output, one of the inputs being coupled with the output of the linear regulator;
an intermediate amplifier stage having an input and an output, the input of the intermediate amplifier stage being coupled to the output of the first amplifier stage;
a driver stage having an input and an output;
a pass device driven by the output of the driver stage, the output of the pass device proving the output of the linear regulator;
a voltage-to-current feedback circuit coupled with the driver stage and the output of the first amplifier stage for regulating the output resistance of the first amplifier stage depending on load conditions of the linear regulator, the voltage-to-current feedback circuit comprising a transistor and a current limitation circuit to limit the regulation of the output resistance of the first amplifier stage to low load conditions of the linear regulator;
a sink device to sink current from the output of the linear regulator, and a sink driver stage to drive the sink device; and
a sink feedback circuit coupled with the sink driver stage and the output of the first amplifier stage for regulating the output resistance of the first amplifier stage depending on load conditions of the linear regulator, the sink feedback circuit comprising a transistor and a current limitation circuit to limit the regulation of the output resistance of the first amplifier stage to low load conditions.

7. The linear regulator of claim 6, wherein the current limitation circuit in the sink feedback circuit limits the amount of current that is sinked from the node between the first amplifier stage and the intermediate voltage amplifier stage.

8. The linear regulator of claim 6, wherein the sink driver stage is coupled with the output of the intermediate amplifier stage or a driver stage replica.

9. The linear regulator of claim 1, the linear regulator being a low dropout regulator.

10. A method of operating a linear regulator comprising a first amplifier stage;
an intermediate amplifier stage; a driver stage; a pass device; and a voltage-to-current feedback circuit,
wherein the input of the driver stage is coupled to an output of said intermediate amplifier stage and the gate of a transistor of said voltage-to-current feedback circuit is coupled with the gate of the pass device, the method comprising the step of:
limiting the gain of the first amplifier stage at low load conditions of the linear regulator by regulating the output resistance of the first amplifier stage depending on load conditions of the linear regulator,
wherein limiting the gain of the first amplifier stage comprises injecting current into a node between the first amplifier stage and the intermediate voltage amplifier stage, the injected current being dependent on the load current provided by the linear regulator.

11. The method of claim 10, wherein limiting the gain of the first amplifier stage is restricted to low load conditions by limiting the amount of injected current.

12. A method of operating a linear regulator comprising the steps of:
providing a first amplifier stage having an input and an output, one of the inputs being coupled with the output of the linear regulator;
providing an intermediate amplifier stage having an input and an output, the input of the intermediate amplifier stage being coupled to the output of the first amplifier stage;
providing a driver stage having an input and an output;
providing a pass device driven by the output of the driver stage, the output of the pass device proving the output of the linear regulator; and
providing a voltage-to-current feedback circuit coupled with the driver stage and the output of the first amplifier stage for regulating the output resistance of the first amplifier stage depending on load conditions of the linear regulator, the voltage-to-current feedback circuit comprising a transistor and a current limitation circuit to limit the regulation of the output resistance of the first amplifier stage to low load conditions of the linear regulator,
providing a driver stage replica coupled between the output of said intermediate amplifier stage and the input of the driver stage, wherein the gate of the transistor of said voltage-to-current feedback circuit is coupled with the driver stage replica.

13. The method of claim 12, wherein said voltage-to-current feedback circuit provides active pole splitting by gain limitation of the first amplifier stage.

14. The method of claim 12, wherein said current limitation circuit comprises a transistor or a current mirror.

15. The method of claim 12, further comprising a sink device to sink current from the output of the linear regulator, and a sink driver stage to drive the sink device.

16. The method of claim 12, the linear regulator being a low dropout regulator.

17. The linear regulator of claim 4, wherein said voltage-to-current feedback circuit provides active pole splitting by gain limitation of the first amplifier stage.

18. The linear regulator of claim 4, wherein said current limitation circuit comprises a transistor or a current mirror.

19. The linear regulator of claim 5, wherein said voltage-to-current feedback circuit provides active pole splitting by gain limitation of the first amplifier stage.

20. The linear regulator of claim 5, wherein said current limitation circuit comprises a transistor or a current mirror.

* * * * *